(12) United States Patent
Oh

(10) Patent No.: US 9,331,554 B2
(45) Date of Patent: May 3, 2016

(54) SYSTEM AND METHOD FOR CONTROLLING MOTOR

(71) Applicant: HANWHA TECHWIN CO., LTD., Changwon-Si (KR)

(72) Inventor: Young Sik Oh, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 57 days.

(21) Appl. No.: 14/320,976

(22) Filed: Jul. 1, 2014

(65) Prior Publication Data
US 2015/0008858 A1    Jan. 8, 2015

(30) Foreign Application Priority Data

Jul. 2, 2013 (KR) .................. 10-2013-0077299
May 22, 2014 (KR) .................. 10-2014-0061796

(51) Int. Cl.
*H02P 23/14* (2006.01)
*H02P 29/02* (2006.01)
*H02K 11/00* (2016.01)
*H02P 29/00* (2016.01)

(52) U.S. Cl.
CPC ............ *H02K 11/0047* (2013.01); *H02K 11/21* (2016.01); *H02K 11/25* (2016.01); *H02P 29/0066* (2013.01)

(58) Field of Classification Search
CPC ................................ H02P 23/14; H02P 29/02

USPC ............ 318/400.21, 434, 471, 472, 473, 490, 318/492
See application file for complete search history.

(56) References Cited

U.S. PATENT DOCUMENTS

| | | | |
|---|---|---|---|
| 4,914,386 A * | 4/1990 | Zocholl ................ | G01R 31/343 174/DIG. 16 |
| 7,091,689 B2 * | 8/2006 | Lee .................... | H02K 11/0047 318/268 |
| 8,013,565 B2 | 9/2011 | Miura et al. | |
| 8,773,058 B2 * | 7/2014 | Baglino ................ | B60L 15/025 318/434 |

FOREIGN PATENT DOCUMENTS

| JP | 2008-245486 A | 10/2008 |
|---|---|---|
| JP | 2009-171640 A | 7/2009 |

* cited by examiner

*Primary Examiner* — Bentsu Ro
(74) *Attorney, Agent, or Firm* — Sughrue Mion, PLLC

(57) ABSTRACT

Provided are a system for controlling a motor and a method thereof. The system includes: a data storage unit in which data relating to a thermal equivalent circuit of the motor is stored; a temperature measuring unit which measures a temperature of a cooling medium which enters a cooling flow path portion; a rotation speed measuring unit which measures a rotation speed of a rotor; a driving electric current measuring unit which measures a driving electric current of the motor; a permanent magnet temperature estimating unit which estimates a temperature of the permanent magnet portion of the rotor; and a driving controller controls driving of the motor.

20 Claims, 5 Drawing Sheets

SYSTEM AND METHOD FOR CONTROLLING MOTOR

CROSS-REFERENCE TO RELATED APPLICATIONS

This application claims priority from Korean Patent Application No. 10-2013-0077299, filed on Jul. 2, 2013, and Korean Patent Application No. 10-2014-0061796, filed on May 22, 2014, in the Korean Intellectual Property Office, the disclosures of which are incorporated herein in their entirety by reference.

BACKGROUND

1. Field

Apparatuses and methods consistent with exemplary embodiments relate to a system and method for controlling a motor.

2. Description of the Related Art

Heat dissipation occurs in motors that generate a driving force, for several reasons of electromotive force generated when the motors are driven, and an eddy-current loss.

Since heat generated in the motors causes life-spans of the motors to be reduced and affects performance, several devices for cooling motors are well-known.

In particular, since a large amount of heat is generated in a stator, several technologies for cooling a motor by dissipating heat generated in the stator are well-known. Korean Patent Laid-open Publication No. 2010-0033857 discloses a technology for cooling a stator using water-cooling.

SUMMARY

One or more exemplary embodiments provide a system and method for controlling a motor, whereby a temperature of a permanent magnet portion disposed at a rotor is estimated and the motor is controlled.

Various aspects will be set forth in part in the description which follows and, in part, will be apparent from the description, or may be learned by practice of the presented embodiments.

According to an aspect of an exemplary embodiment, there is provided a system for controlling a motor which includes a stator, a rotor which is disposed in a state in which an air gap is interposed between the stator and the rotor and which includes a permanent magnet portion, a housing which accommodates the stator and the rotor, and a cooling flow path portion which is disposed at the housing and in which a cooling medium passes therethrough, the system comprising: a data storage unit configured to store data relating to a thermal equivalent circuit of the motor; a temperature measuring unit configured to measure a temperature of the cooling medium which enters the cooling flow path portion; a rotation speed measuring unit configured to measure a rotation speed of the rotor; a driving electric current measuring unit configured to measure a driving electric current of the motor; a permant magnet temperature estimating unit configured to estimate a temperature of the permanent magnet portion of the rotor using the data stored in the data storing unit, a temperature value of the cooling medium measured by the temperature measuring unit, a rotation speed value of the rotor measured by the rotation speed measuring unit, and a driving electric current value measured by the driving electric current measuring unit; and a driving controller configured to control driving of the motor.

The stator may include: a stator core; coils wound around the stator core; and an insulating member disposed between the stator core and the coils.

In the thermal equivalent circuit, heating sources may include the stator core, the coils and the permanent magnet portion.

In the thermal equivalent circuit, thermal resistances may include resistances at the rotor, the stator core, the housing, and the cooling medium.

The permanent magnet temperature estimating unit may obtain a reference torque value of the motor using the driving electric current value of the motor, obtain an efficiency value of the motor using the reference torque value of the motor and the rotation speed value of the rotor, obtain total loss heat of the motor from the efficiency value of the motor, obtain a temperature value of the cooling medium discharged from the cooling flow path portion using the total loss heat of the motor, and estimate a temperature value of the permanent magnet portion using the temperature value of the cooling medium discharged from the cooling flow path portion and values of the thermal resistances.

The permanent magnet temperature estimating unit may obtain an efficiency value of the motor using the driving electric current value of the motor and the rotation speed value of the rotor, obtain total loss heat of the motor from the efficiency value of the motor, obtain a temperature value of the cooling medium discharged from the cooling flow path portion using the total loss heat of the motor, and estimate a temperature value of the permanent magnet portion using the temperature value of the cooling medium discharged from the cooling flow path portion and the values of the thermal resistances.

The system may further include a torque estimating unit that estimates a torque value of the motor using the temperature value estimated by the permanent magnet temperature estimating unit.

The driving controller may control driving of the motor using the estimated torque value of the motor.

The driving controller may define a safe temperature of the permanent magnet portion and control a driving electric current input to the motor if the estimated temperature value of the permanent magnet portion reaches the safe temperature.

The safe temperature of the permanent magnet portion may be related to a level of demagnetization of a permanent magnet of the permanent magnet portion.

According to an aspect of another exemplary embodiment, there is provided a method of controlling a motor which includes a stator, a rotor which is disposed in a state in which an air gap is interposed between the stator and the rotor and which comprises a permanent magnet portion, a housing which accommodates the stator and the rotor, and a cooling flow path portion which is disposed at the housing and in which a cooling medium passes through, the method including: configuring a thermal equivalent circuit of the motor; checking a temperature value of the cooling medium which enters the cooling flow path portion, a rotation speed value of the rotor, and a driving electric current value of the motor; estimating a temperature value of the permanent magnet portion of the rotor using the thermal equivalent circuit, the temperature value of the cooling medium which enters the cooling flow path portion, the rotation speed value of the rotor, and the driving electric current value of the motor; and controlling driving of the motor.

The stator may include: a stator core; coils wound around the stator core; and an insulating member disposed between the stator core and the coils.

In the thermal equivalent circuit, heating sources may include the stator core, the coils, and the permanent magnet portion.

In the thermal equivalent circuit, thermal resistances may include resistances of the rotor, the air gap, the stator core, the insulating member, the housing and the cooling fluid.

The estimating the temperature value of the permanent magnet portion may include: obtaining a reference torque value of the motor using the driving electric current value of the motor; obtaining an efficiency value of the motor using the reference torque value of the motor and the rotation speed value of the rotor; obtaining total loss heat of the motor from the efficiency value of the motor; obtaining a temperature value of the cooling medium discharged from the cooling flow path portion using the total loss heat of the motor; and estimating a temperature value of the permanent magnet portion using the temperature value of the cooling medium discharged from the cooling flow path portion and values of the thermal resistances.

The estimating the temperature value of the permanent magnet portion may include: obtaining an efficiency value of the motor using the driving electric current value of the motor and the rotation speed value of the rotor; obtaining total loss heat of the motor from the efficiency value of the motor; obtaining a temperature value of the cooling medium discharged from the cooling flow path portion using the total loss heat of the motor; and estimating a temperature value of the permanent magnet portion using the temperature value of the cooling medium discharged from the cooling flow path portion and the values of the thermal resistances.

The method may further include estimating a torque value of the motor using the estimated temperature value of the permanent magnet portion.

The controlling of driving of the motor may include controlling driving of the motor using the estimated torque value of the motor.

The controlling of driving of the motor may include: defining a safe temperature of the permanent magnet portion; and controlling a driving electric current input to the motor if the estimated temperature value of the permanent magnet portion reaches the safe temperature.

The safe temperature of the permanent magnet portion may be related to a level of demagnetization of a permanent magnet of the permanent magnet portion.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
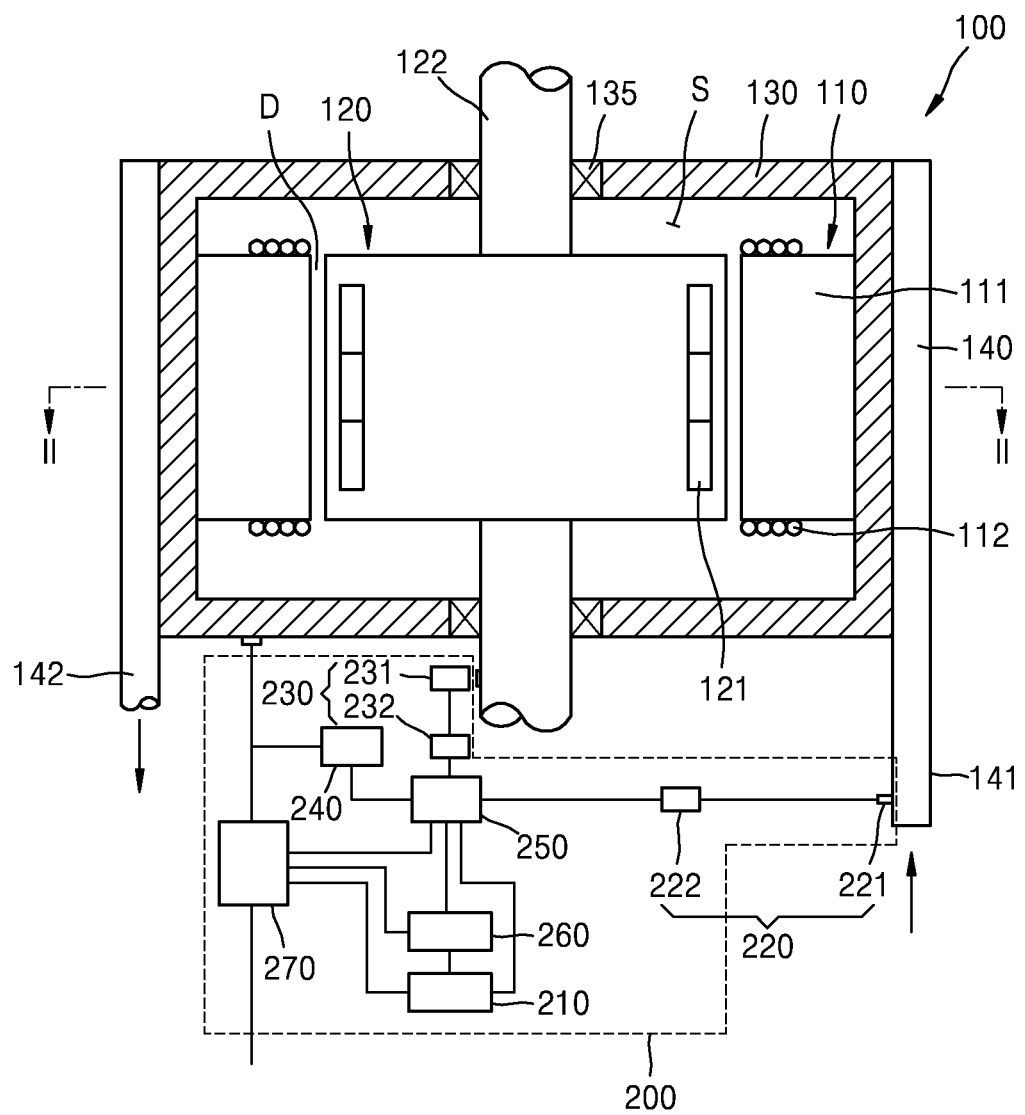
FIG. 1 is a cross-sectional view illustrating a schematic configuration of a motor according to an exemplary embodiment.

Reference will now be made in detail to exemplary embodiments which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the drawings, to explain aspects of the inventive concept. Also, in the specification and the drawings, like elements that substantially have the same configurations refer to like reference numerals, and thus, redundant descriptions thereof will be omitted.

Figure 2:
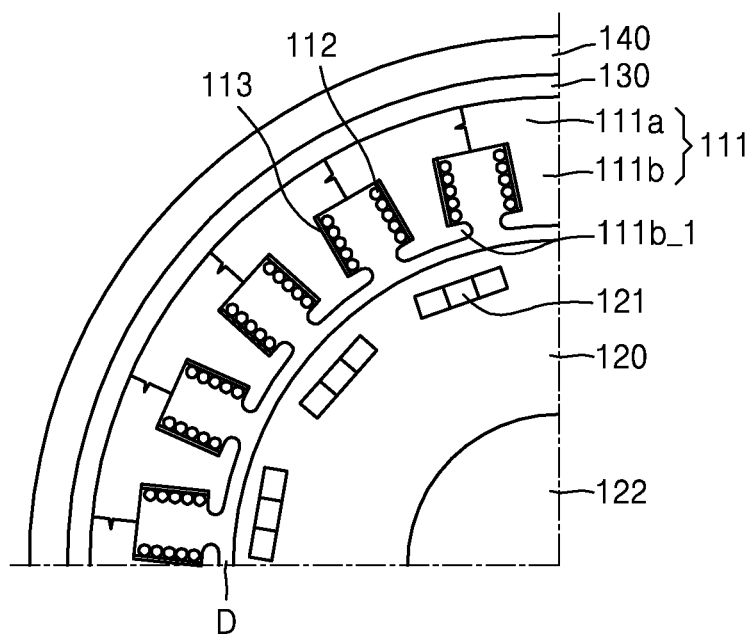
FIG. 2 is a view illustrating part of a cross-sectional view taken along line II-II of FIG. 1, according to an exemplary embodiment.

FIG. 1 is a cross-sectional view illustrating a schematic configuration of a motor according to an exemplary embodiment, and FIG. 2 is a view illustrating part of a cross-sectional view taken along line II-II of FIG. 1.

As illustrated in FIGS. 1 and 2, a motor 100 according to an exemplary embodiment has a structure of an interior permanent magnet synchronous motor (IPMSM) in which a permanent magnet is embedded in a rotor 120. The motor 100 includes a stator 110, the rotor 120, a housing 130, and a cooling flow path portion 140.

The stator 110 includes a stator core 111, coils 112 wound around the stator core 111, and an insulating member 113 disposed between the stator core 111 and the coils 112.

If electricity is supplied to the stator 110, the stator 110 interacts with the rotor 120 and generates a rotational force for rotating the rotor 120.

A material for the stator core 111 according to the current embodiment may be a ferromagnetic material, such as iron (Fe).

Although the stator core 111 according to the current embodiment is configured of a single member, embodiments are not limited thereto. That is, the stator core 111 according to an exemplary embodiment may have a shape in which a plurality of steel plates are stacked. In this case, an eddy current may be reduced.

Figure 3:
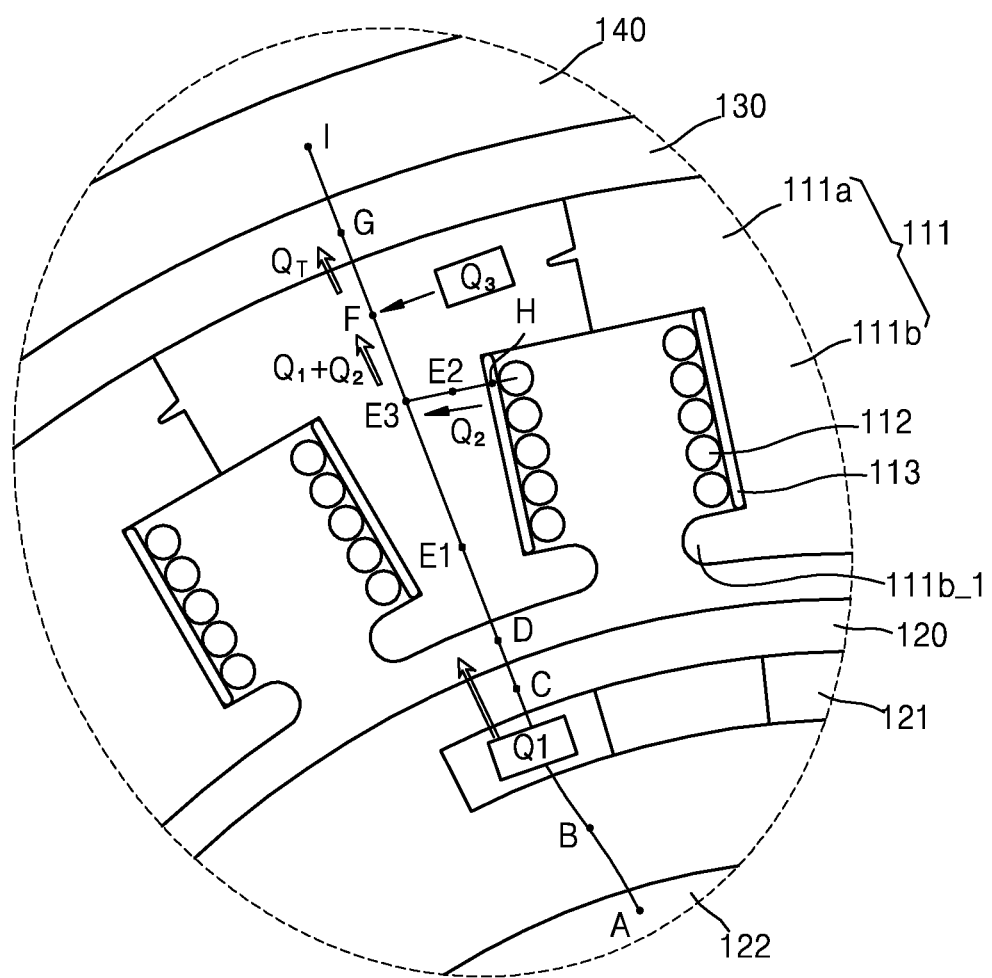
FIG. 3 is an enlarged view of part of FIG. 2 that schematically illustrates a heat transfer path for explanation, according to an exemplary embodiment.
Figure 4:
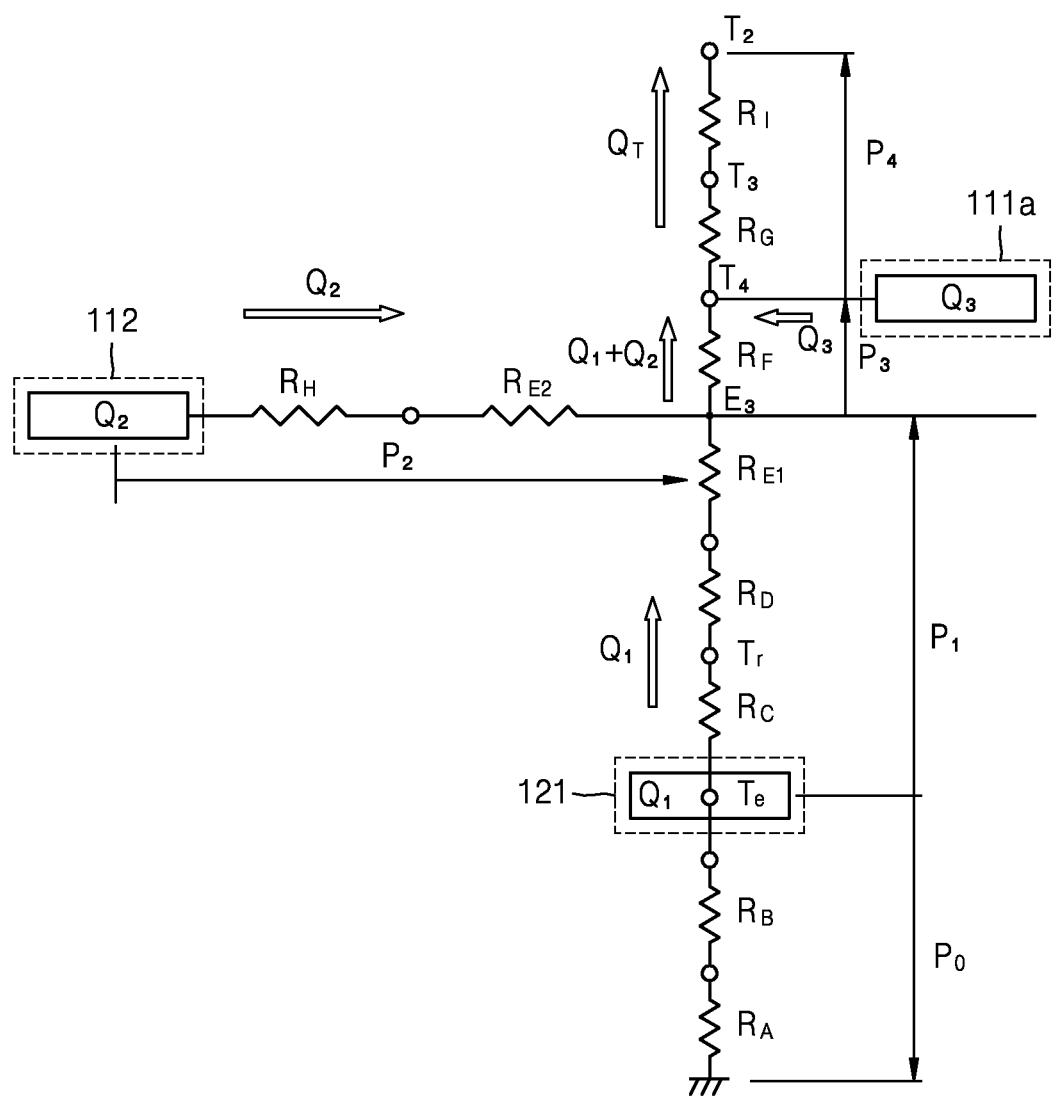
FIG. 4 illustrates a thermal equivalent circuit of the motor illustrated in FIG. 1, according to an exemplary embodiment.

As illustrated in FIGS. 2 through 4, the stator core 111 includes a yoke 111a having a circular ring shape and a plurality of teeth 111b that protrude from the yoke 111a in a circular central direction. The yoke 111a and the plurality of teeth 111b may be simultaneously formed using a mold. Also, each of the teeth 111b includes a pair of shoes 111b_1 that extend from ends of each of the teeth 111b.

The coils 112 are wound around the teeth 111b of the stator core 111. A coil material that is generally used in a winding portion of a stator in the field of a motor technology may be used for the coils 112.

The insulating member 113 may be disposed between the stator core 111 and the coils 112. The insulating member 113 may be configured as an insulating member, such as an insulating paper that is generally used in the field of a motor technology.

The rotor 120 may include a permanent magnet portion 121 and a rotation shaft 122. The rotor 120 is spaced apart from the stator core 111 by an air gap D.

The permanent magnet portion 121 have a plurality of permanent magnets and is disposed in the rotor 120.

The rotation shaft 122 is a center of rotation of the rotor 120 and is installed at the housing 130 by using bearings 135.

The rotation shaft 122 according to the current embodiment has a shape of a solid shaft. However, embodiments are not limited thereto. That is, the rotation shaft 122 according to an exemplary embodiment may have a shape of a hollow shaft.

The rotor 120 may have other configurations than the above-described configuration of the rotor 120. Other configurations may be configurations of well-known rotors used in several types of motors. Thus, a detailed description thereof will be omitted.

The housing 130 accommodates the stator 110 and the rotor 120. A rotor installation space S in which the rotor 120 is installed, exists in the housing 130.

The cooling flow path portion 140 is disposed at the housing 130, and a cooling fluid flows through the cooling flow path portion 140.

Since the cooling flow path portion 140 contacts an outer surface of the housing 130, the cooling flow path portion 140 transmits heat of the housing 130 to an internal cooling fluid, thereby removing heat from the housing 130. To this end, the cooling flow path portion 140 includes a fluid inlet portion 141 into which a new cooling fluid having a low temperature is introduced, and a fluid discharging portion 142 through which the cooling fluid to which heat is transferred, is discharged.

The cooling flow path portion 140 according to the current embodiment is configured to contact the outer surface of the housing 130. However, embodiments are not limited thereto. That is, the cooling flow path portion 140 according to an exemplary embodiment may also be installed at an inner side of the housing 130.

Water is used as the cooling fluid disposed in the cooling flow path portion 140 according to the current embodiment. However, embodiments are not limited thereto. That is, other material than water, for example, a cooling oil, may be used as the cooling fluid according to an exemplary embodiment. Also, other types of cooling medium may also be used according to an exemplary embodiment.

A system 200 for controlling a motor according to the current embodiment that is a system for controlling driving of the motor 100, includes a data storage unit 210, a temperature measuring unit 220, a rotation speed measuring unit 230, a driving electric current measuring unit 240, a permanent magnet temperature estimating unit 250, a torque estimating unit 260, and a driving controller 270.

Data, such as equations and functions relating to a thermal equivalent circuit of the motor 100, tables, permanent magnet polar constants, inductance, reference magnetic flux interlinkage and temperature coefficients with respect to the motor 100, may be stored in the data storage unit 210. If necessary, operating programs required to drive the motor 100 may also be stored in the data storage unit 210. If necessary, the permanent magnet temperature estimating unit 250, the torque estimating unit 260, and the driving controller 270 are configured to access to the data storage unit 210 and to bring desired data.

A device that is generally widely used for data storage, for example, a data recording device having various formats, such as random access memory (RAM), read only memory (ROM), and hard disks, may be used as the data storage unit 210 without limitations.

As described above, data relating to the thermal equivalent circuit is stored in the data storage unit 210. The shape of the thermal equivalent circuit is determined according to an internal structure of the motor 100 and an intention of a designer of the thermal equivalent circuit. That is, generally, as the internal structure of the motor 100 is complicated, the thermal equivalent circuit becomes more complicated. However, even when the internal structure of the motor 100 is complicated, if a designer regards feasibility of calculation as important than precision of the thermal equivalent circuit, the thermal equivalent circuit may be more simply configured.

For conveniences of explanation, an example of the thermal equivalent circuit according to the structure of the motor 100 according to the current embodiment will be described with reference to FIGS. 3 and 4.

FIG. 3 is an enlarged view of part of FIG. 2 that schematically illustrates a heat transfer path, and FIG. 4 illustrates an example of a thermal equivalent circuit of the motor illustrated in FIG. 1. Thermal resistances and thermal paths of elements of the motor 100 are illustrated in FIGS. 3 and 4.

In FIG. 3, three elements of the motor 100 are configured of main heating sources when the motor 100 is driven. That is, the permanent magnet portion 121, the coils 112, and the stator core 111 are selected as the main heating sources. Loss heat $Q_1$ is generated in the permanent magnet portion 121, and loss heat $Q_2$ is generated in the coils 112, and loss heat $Q_3$ is generated in the stator core 111.

In the thermal equivalent circuit of FIG. 4, the loss heat $Q_1$, $Q_2$ and $Q_3$ pass through thermal paths in the elements of the motor 100 and are transferred to the cooling fluid of the cooling flow path portion 140. The thermal paths may be indicated as $P_0$, $P_1$, $P_2$, $P_3$ and $P_4$, as illustrated in FIG. 4. In this case, it is assumed that heat is transferred to the other thermal paths $P_1$, $P_2$, $P_3$ and $P_4$ except for $P_0$.

The elements of the motor 100 through which heat passes through thermal paths, may be expressed as thermal resistances. The thermal resistances of the elements of the motor 100 may be classified into heat conduction type thermal resistances and convection heat transferring type thermal resistances according to a heat transferring method.

A thermal resistance $R_k$ of the heat conduction type may be indicated by the following Equation 1 from the Fourier's thermal conduction equation.

$$R_k = \frac{L}{kA_1}, \tag{1}$$

where k is thermal conductivity, and L is a thickness of a conductive material, and $A_1$ is the area of the conductive material.

Also, a thermal resistance $R_{convection}$ of the convection heat transferring type may be indicated by the following Equation 2 from the Newton's law of cooling.

$$R_{convection} = \frac{1}{\overline{h}_c A_2}, \tag{2}$$

where $\overline{h}_c$ is a unit thermal convection conductance or an average convection heat transfer coefficient, and $A_2$ is a surface area that contacts a fluid.

In the current embodiment, in FIG. 3, the elements of the motor 100 that exist on the thermal path are indicated by A, B, C, D, E1, E2, E3, F, G, H and I. Here, A is a portion of the rotation shaft 122, and B is an inner portion of the rotor 120 between the permanent magnet portion 121 and the rotation shaft 122, and C is an outer portion of the rotor 120 between the permanent magnet portion 121 and an air gap D, and D is a portion of the air gap, and E1, E2 and E3 are portions of the teeth 111*b* of the stator core 111, and F is a portion of the yoke 111*a* of the stator core 111, and G is a portion of the housing 130, and H is a portion of the insulating member 113, and I is a portion of the cooling fluid.

In FIG. 4, thermal resistances that correspond to A, B, C, D, E1, E2, F, G, H and I illustrated in FIG. 3 are indicated by $R_A$, $R_B$, $R_C$, $R_D$, $R_{E1}$, $R_{E2}$, $R_F$, $R_G$, $R_H$ and $R_I$.

When the shape and arrangement of the elements of the motor 100 illustrated in FIG. 3 and a heat transfer medium are considered, thermal resistances that are preferable in terms of the heat conduction method are a thermal resistance $R_A$ against the rotation shaft 122, a thermal resistance $R_B$ of the inner portion of the rotor 120, a thermal resistance $R_C$ of the outer portion of the rotor 120, thermal resistances $R_{E1}$ and $R_{E2}$ of the teeth 111b of the stator core 111, a thermal resistance $R_F$ of the yoke 111a of the stator core 111, a thermal resistance $R_G$ of the housing 130, and a thermal resistance $R_H$ of the insulating member 113. Also, thermal resistances that are preferable in terms of a convection heat transferring method are a thermal resistance $R_D$ of the air gap D and a thermal resistance $R_I$ of the cooling fluid of the cooling flow path portion 140.

According to the current embodiment, the thermal resistances $R_A$, $R_B$, $R_C$, $R_{E1}$, $R_{E2}$, $R_F$, $R_G$ and $R_H$ may be expressed using the heat conduction method, and the thermal resistances $R_D$ and $R_I$ may be expressed using the convection heat transferring method. However, embodiments are not limited thereto. For example, for conveniences of calculation, all of the thermal resistances $R_A$, $R_B$, $R_C$, $R_{E1}$, $R_{E2}$, $R_F$, $R_G$, $R_H$, $R_D$ and $R_I$ may also be expressed using the heat conduction method.

As shown in Equations 1 and 2, the thermal resistances may be calculated using dimensions of the elements and conductivity or a heat transfer coefficient of the heat transfer medium.

A heat transfer process of the thermal equivalent circuit of FIG. 4 will now be described with reference to FIG. 3.

In actuality, the loss heat $Q_1$ generated in the permanent magnet portion 121 is moved to the inner portion (portion B of FIG. 3) of the rotor 120 and the outer portion (portion C of FIG. 3) of the rotor 120. It is assumed that, in the thermal equivalent circuit of FIG. 4, the loss heat $Q_1$ is not moved to the inner portion (portion B of FIG. 3) of the permanent magnet portion 121. This assumption is made because a heat transfer rate to the inner portion of the rotor 121 is actually low and thus conveniences of calculation are achieved through simplification of equations. Thus, it is assumed that the loss heat $Q_1$ is moved only to the outer portion (portion C of FIG. 3) of the permanent magnet portion 121 and passes through the thermal resistance $R_C$.

Subsequently, the loss heat $Q_1$ is moved to the air gap D between the stator 110 and the rotor 120 and passes through the thermal resistance $R_D$ and then is moved to part (portion E1 of FIG. 3) of the teeth 111b of the stator core 111 due to convection heat transfer and passes through the thermal resistance $R_{E1}$.

Subsequently, the loss heat $Q_1$ is moved to a middle portion (portion E3 of FIG. 3) of the teeth 111b of the stator core 111 and joins a thermal flow of the loss heat $Q_2$.

The loss heat $Q_2$ generated in the coils 112 is moved to the insulating member 113 that contacts the coils 112 and passes through the thermal resistance $R_H$ and then is moved to sides (portion E2 of FIG. 3) of the teeth 111b and passes through the thermal resistance $R_{E2}$. Subsequently, the loss heat $Q_2$ is moved to the middle portion (portion E3 of FIG. 3) of the teeth 111b of the stator core 111 and joins a thermal flow of the loss heat $Q_1$.

The thermal flow in which the loss heat $Q_1$ and $Q_2$ joins, is moved to the yoke 111a (portion F of FIG. 3) of the stator core 111 and passes through the thermal resistance $R_F$. The loss heat $Q_3$ is generated in the yoke 111a of the stator core 111 and additionally joins the joined thermal flow of the loss heat $Q_1$ and $Q_2$.

A total joined thermal flow of the loss heat $Q_1$, $Q_2$ and $Q_3$ is defined as $Q_T$. $Q_T$ is moved to the housing 130 (portion G of FIG. 3) and passes through the thermal resistance $R_G$. Subsequently, $Q_T$ is moved to the cooling fluid (portion I of FIG. 3) of the cooling flow path portion 140, passes through the thermal resistance $R_I$ and raises the temperature of the cooling fluid.

The state of the thermal flow in the thermal equivalent circuit has been described as above. After the thermal equivalent circuit is designed and values of the thermal resistances are obtained, data thereof are stored in the data storage unit 210 and are used to estimate the temperature of the permanent magnet of the permanent magnet portion 121.

The temperature measuring unit 220 measures the temperature of the cooling fluid that enters the cooling flow path portion 140. The temperature measuring unit 220 includes a temperature measuring sensor 221 that is installed at the fluid inlet portion 141 of the cooling flow path portion 140 and a temperature calculating unit 222 that calculates temperature by calculating the result of measurement received from the temperature measuring sensor 221.

The temperature measuring sensor 221 has only to be a unit that may send a temperature value measured by measuring temperature to the temperature calculating unit 222. There is no special limitations in selecting the temperature measuring sensor 221. For example, an electronic temperature measuring sensor may be used as the temperature measuring sensor 221.

In the current embodiment, the temperature calculating unit 222 is configured to be separated from the driving controller 270. However, embodiments are not limited thereto. That is, according to an exemplary embodiment, the temperature calculating unit 222 may be configured to be included in the driving controller 270.

The rotation speed measuring unit 230 includes a speed measuring sensor 231 that measures the rotation speed of the rotation shaft 122, and a speed calculating unit 232 that calculates speed by calculating the result of measurement received from the speed measuring sensor 231.

The rotation speed measuring unit 230 has only to be a unit that may send a rotation speed measured by measuring the rotation speed of the rotation shaft 122 to the speed calculating unit 232, and there are no special limitations in selecting the speed measuring sensor 231. For example, a non-contact type magnetic sensor or an optical sensor may be used as the speed measuring sensor 231. Also, a general contact type speed measuring sensor may be used as the speed measuring sensor 231.

In the current embodiment, the speed calculating unit 232 is configured to be separated from the driving controller 270. However, embodiments are not limited thereto. That is, according to an exemplary embodiment, the speed calculating unit 232 may be configured to be included in the driving controller 270.

The driving electric current measuring unit 240 performs a function of measuring a driving electric current input to the motor 100. The driving electric current measuring unit 240 may be implemented in the form of an electric current measuring device or an electric current measuring circuit that is generally used.

In the current embodiment, the driving electric current measuring unit 240 is configured to be separated from the driving controller 270. However, embodiments are not limited thereto. That is, according to an exemplary embodiment, the driving electric current measuring unit 240 is configured to be included in the driving controller 270.

The permanent magnet temperature estimating unit 250 performs a function of estimating the temperature of the permanent magnet of the permanent magnet portion 121 of the rotor 120. The permanent magnet temperature estimating unit 250 may be implemented in the form of a series of programs that execute a temperature estimating operation or in the form of integrated circuit (IC) chips on which the programs are installed.

In the current embodiment, the permanent magnet temperature estimating unit 250 is configured to be separated from the driving controller 270. However, embodiments are not limited thereto. That is, according to an exemplary embodiment, the permanent magnet temperature estimating unit 250 may be configured to be included in the driving controller 270.

The permanent magnet temperature estimating unit 250 estimates the temperature of the permanent magnet of the permanent magnet portion 121 using the data stored in the data storage unit 210, the temperature of the cooling fluid measured by the temperature measuring unit 220, the rotation speed of the rotation shaft 122 measured by the rotation speed measuring unit 230, and the driving electric current of the motor 100 measured by the driving electric current measuring unit 240. A detailed estimating process will be described later.

The torque estimating unit 260 performs a function of estimating an actual torque of the motor 100 using the temperature of the permanent magnet of the permanent magnet portion 121 that is measured by the permanent magnet temperature estimating unit 250. The torque estimating unit 260 may be implemented in the form of a series of programs that execute a torque estimating operation or in the form of IC chips on which the programs are installed.

In the current embodiment, the torque estimating unit 260 is configured to be separated from the driving controller 270. However, embodiments are not limited thereto. That is, according to an exemplary embodiment, the torque estimating unit 260 may be configured to be included in the driving controller 270.

The torque estimating unit 260 estimates an actual torque of the motor 100 using the estimated temperature of the permanent magnet portion 121 estimated by the permanent magnet temperature estimating unit 250 and the data stored in the data storage unit 210. A detailed estimating process will be described later.

In the current embodiment, the system 200 for controlling the motor includes the torque estimating unit 260. However, embodiments are not limited thereto. That is, the system 200 for controlling the motor according to an exemplary embodiment may not include the torque estimating unit 260.

The driving controller 270 directly controls driving of the motor 100. The driving controller 270 may be implemented in the form of a series of programs that execute driving of the motor 100 or in the form of IC chips on which the programs are installed.

The driving controller 270 controls driving of the motor 100 by receiving and reflecting the temperature of the permanent magnet estimated by the permanent magnet temperature estimating unit 250. A detailed driving controlling process will be described later.

The system 200 for controlling the motor according to the current embodiment is disposed outside the housing 130 of the motor 100. However, embodiments are not limited thereto. That is, the system 200 for controlling the motor according to an exemplary embodiment may also be disposed inside the housing 130.

Hereinafter, an operation in which the system 200 for controlling the motor according to the current embodiment controls the motor 100 will be described.

If a user gives an instruction for driving the motor 100 to the system 200, the system 200 for controlling the motor drives the motor 100 by applying a driving electric current to the motor 100. Here, the magnitude of the driving electric current that is applied by the system 200 for controlling the motor to the motor 100 is determined by the magnitude of a torque of the motor 100 that is set by the user.

If the motor 100 is driven, the rotor 120 starts rotating due to an electromagnetic interaction between the stator 110 and the rotor 120, and heat starts to be generated in the elements of the motor 100. That is, loss heat is generated in the elements of the motor 100. The loss heat $Q_1$, $Q_2$ and $Q_3$ are generated in three main heating sources, i.e., the permanent magnet portion 121, the coils 112, and the stator core 111, and a thermal flow occurs in the motor 100.

The temperature measuring unit 220 of the system 200 for controlling the motor measures the temperature of the cooling fluid that enters the cooling flow path portion 140 and sends the result of measurement to the permanent magnet temperature estimating unit 250, and the rotation speed measuring unit 230 measures the rotation speed of the rotation shaft 122 and sends the result of measurement to the permanent magnet temperature estimating unit 250, and the driving electric current measuring unit 240 measures the driving electric current input to the motor 100 and sends the result of measurement to the permanent magnet temperature estimating unit 250.

The permanent magnet temperature estimating unit 250 estimates the temperature of the permanent magnet portion 121 of the rotor 120 using the data stored in the data storage unit 210, the temperature of the cooling fluid that enters the cooling flow path portion 140, the rotation speed of the rotor 120 (rotation shaft 122), and a value of the driving electric current of the motor 100, and a process thereof will now be described in detail.

A basic heat transfer equation indicated by the following Equation 3 is used to estimate the temperature of the permanent magnet of the permanent magnet portion 121.

$$Q_i = \frac{\Delta T}{R_i}, \tag{3}$$

where $\Delta T$ is a variation quantity of temperature, and $R_i$ is a thermal resistance, and $Q_i$ is each of loss heat $Q_1$, $Q_2$ and $Q_3$ or a quantity of a joined thermal flow of the loss heat $Q_1$, $Q_2$ and $Q_3$. A method of applying Equation 3 to the current embodiment will be briefly described. That is, after each of loss heat $Q_1$, $Q_2$ and $Q_3$ or the quantity of the joined thermal flow of loss heat is obtained, the quantity of the thermal flow is multiplied by a thermal resistance value, thereby obtaining the variation quantity of temperature $\Delta T$. In this case, a final value of a temperature may be known by knowing an initial value of the temperature and thus, the temperature of each of the elements of the motor 100 on a thermal path may be obtained. A detailed description of calculation will be provided later, and firstly, a process of obtaining a value of a total quantity $Q_T$ of the joined thermal flow of loss heat $Q_1$, $Q_2$ and $Q_3$ using data regarding torque-revolutions per minute (rpm)-efficiency of the motor 100 according to the current embodiment will be described with reference to FIG. 5.

Figure 5:
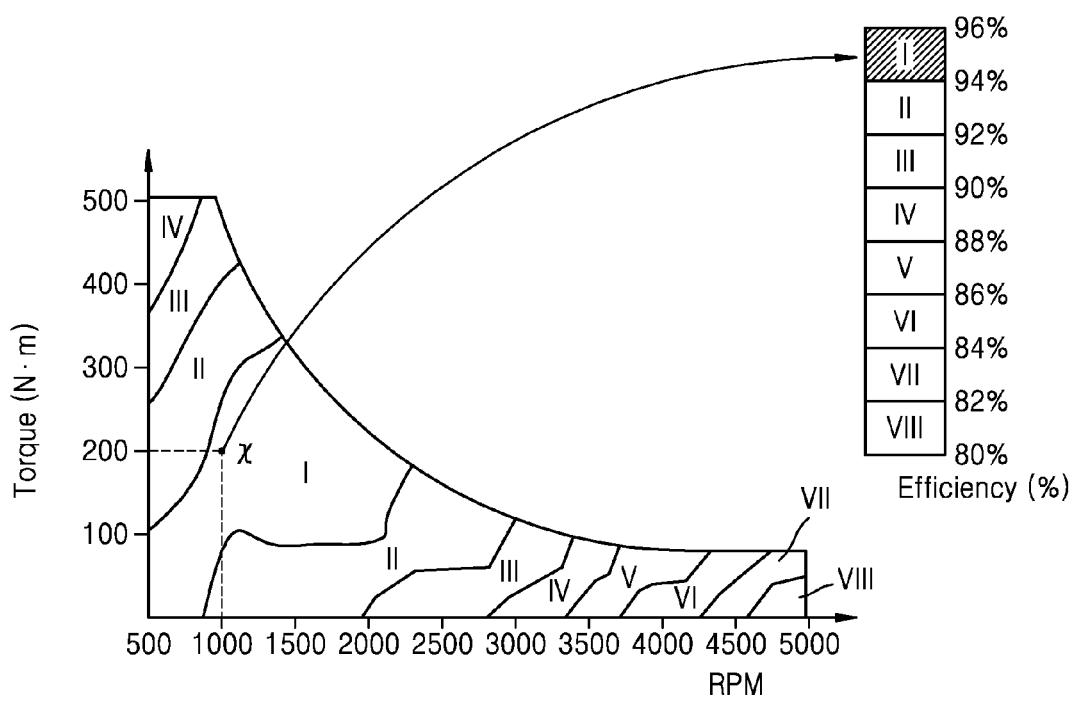
FIG. 5 is a graph showing a reference torque, revolutions per minute (rpm), and efficiency of the motor of FIG. 1, according to an exemplary embodiment.

FIG. 5 is a graph showing a reference torque, rpm, and efficiency of the motor of FIG. 1.

The total quantity $Q_T$ of the joined thermal flow of loss heat $Q_1$, $Q_2$, and $Q_3$ may be obtained using data regarding torque-rpm-efficiency of the motor 100 according to the current embodiment (see FIG. 5), a value of the measured driving electric current of the motor 100, and a value of the rotation speed of the rotor 120.

Here, if the value of the measured driving electric current of the motor 100 is known, a value of a reference torque $\tau_{ref}$ of the motor 100 may be theoretically obtained. Here, the obtained value of the reference torque $\tau_{ref}$ is a theoretical value in which a variation quantity of magnetic flux interlinkage $\phi_a$, that occurs when the motor 100 is driven, is not considered, is different from a torque $\tau_e$ estimated by the torque estimating unit 260 that will be described later.

Subsequently, if the obtained value of the reference torque $\tau_{ref}$ and the rotation speed $\omega$ of the rotor 120 correspond to the data regarding motor torque-rpm-efficiency, the efficiency of the motor 100 may be determined. As an example using FIG. 5, the efficiency of a motor at an x-point (where a torque is 200 Nm and rpm is 1000 rpm) of the graph of the motor torque-rpm is about 95%.

That is, in FIG. 5, the reference torque $\tau_{ref}$ of the motor 100, the rotation speed $\omega$ of the rotor 120, and the efficiency of the motor 100 are data that may be previously obtained by performing experiments or simulation on the motor 100. The data are previously stored in the data storage unit 210. The permanent magnet temperature estimating unit 250 causes the value of the reference torque $\tau_{ref}$ of the motor 100 and the value of the rotation speed $\omega$ of the rotor 120 to correspond to the efficiency data of the data storage unit 210. That is, the permanent magnet temperature estimating unit 250 causes the value of the reference torque $\tau_{ref}$ of the motor 100 and the value of the rotation speed $\omega$ of the rotor 120 to correspond to the efficiency data, thereby searching for a value of the efficiency of the motor 100 according to the reference torque $\tau_{ref}$ of the motor 100 and the rotation speed $\omega$ of the rotor 120.

According to the current embodiment, the value of the efficiency of the motor 100 is obtained by theoretically obtaining the value of the reference torque of the motor 100 from the value of the driving electric current and by causing the obtained value of the reference torque of the motor 100 and the value of the rotation speed of the rotor 120 to correspond to the data regarding motor reference torque-rpm-efficiency. However, embodiments are not limited thereto. That is, according to an exemplary embodiment, the value of the efficiency of the motor 100 may also be obtained by causing the value of the driving electric current to correspond to data regarding driving electric current-rpm-efficiency without mediating the value of the reference torque of the motor 100. In this case, data regarding driving electric current-rpm-efficiency has to be prepared, instead of data regarding motor reference torque-rpm-efficiency. However, the value of the efficiency of the motor 100 may be obtained without converting the value of the driving electric current into the reference torque.

If the efficiency of the motor 100 is determined in a state in which the motor 100 is driven using the above-described method, a total loss work $W_T$ of the motor 100 is determined by the following Equation 4.

$$W_T = (1-\eta)P_i \quad (4),$$

where $\eta$ is the efficiency of a motor, and $P_i$ is input electric power.

It is assumed that, if the loss work $W_T$ is obtained, the loss work is converted into loss heat for simplification of equation and effective analysis. If so, all of the loss work $W_T$ become loss heat $Q_T$.

In this way, the user may estimate total loss heat $Q_T$ of the motor 100 using the reference torque of the motor 100 and the rotation speed of the rotor 120.

On the other hand, if it is assumed that the total loss heat $Q_T$ of the motor 100 is transmitted to the cooling fluid of the cooling flow path portion 140, a discharge temperature $T_2$ of the cooling fluid may be obtained using $Q_T$, as shown in the following Equation 5.

$$Q_T = C_s m(T_2 - T_1) \quad (5),$$

where $T_1$ is a temperature of the cooling fluid that enters the cooling flow path portion 140, and $C_s$ is specific heat of the cooling fluid, and m is mass of the cooling fluid.

After the discharge temperature $T_2$ of the cooling fluid is obtained in such a manner, a temperature $T_3$ of the housing 130 may be obtained. That is, a thermal resistance $R_I$ of the cooling fluid of the cooling flow path portion 140 may be obtained using Equation 2, and the temperature $T_3$ of the housing 130 may be obtained using the following Equations 6 and 7 based on Equation 3.

$$Q_T = \frac{T_3 - T_2}{R_I} \quad (6)$$

$$T_3 = T_2 + Q_T R_I \quad (7)$$

For example, if $T_2$ is 340K (Kelvin), $Q_T$ is 500 W and $R_I$ is 0.03K/W, $T_3$ is 355K based on calculation using the above Equation 7.

As described above, a method of estimating the temperature $T_3$ of the housing 130 from the temperature $T_2$ has been described. Since the temperature $T_3$ of the housing 130 has been obtained, a temperature $T_4$ (temperature after loss heat $Q_3$ joins) of the yoke 111a of the stator core 111 may also be estimated using the following Equation 8 in the same manner.

$$T_4 = T_3 + Q_T R_G \quad (8)$$

The permanent magnet temperature estimating unit 250 may perform repeated calculation described above, and may estimate the temperature of each of the elements of the motor 100 sequentially. That is, if a value of a thermal flow that passes through a thermal path and a thermal resistance are known, the temperature of each element of the motor 100 may be estimated using Equation 3. That is, the temperature of the teeth 111b of the stator core 111, the temperature of the outer portion B of the rotor 120, and the temperature of the permanent magnet portion 121 of the rotor 120 may be sequentially obtained.

For example, the temperature $T_e$ of the permanent magnet portion 121 of the rotor 120 may also be estimated using the following Equation 9.

$$T_e = T_r + Q_1 R_c \quad (9).$$

where $T_r$ is a temperature of the outer portion C (FIG. 3) of the rotor 120, and $R_c$ is the thermal resistance of the outer portion C (FIG. 3) of the rotor 120.

If values of the loss heat $Q_2$ and $Q_3$ are precisely measured in the temperature estimation process, a value of loss heat $Q_1$ and a temperature value of the permanent magnet portion 121 may be more precisely estimated. To this end, by mounting a temperature sensor near the yoke 111a of the stator core 111 and the coils 112, precise measurement of loss heat $Q_2$ and $Q_3$ may be performed.

On the other hand, if a temperature $T_e$ of the permanent magnet portion 121 of the rotor 120 is estimated by the permanent magnet temperature estimating unit 250, the torque estimating unit 260 may estimate an actual torque of the motor 100 using the estimated temperature $T_e$ of the permanent magnet. That is, the torque estimating unit 260 estimates an actual torque τ by performing calculations using the temperature $T_e$ of the permanent magnet estimated by the permanent magnet temperature estimating unit 250. Hereinafter, an example in which the actual torque of the motor 100 is estimated by the torque estimating unit 260, will be described.

First, since the motor 100 according to the current embodiment as an IPMSM is an alternating electric current (AC) electric motor that is expressed as three phases, such as a, b and c, it is convenient to remove time-varying coefficients for analysis and control. Thus, coordinate transformation is performed using a coordinate transformation technique of "d-q conversion" that transforms coordinates into variants on a rectangular coordinate system.

A value of the torque τ of the motor 100 may be expressed by the following Equation 10.

$$\tau = \tau_m + \tau_r \quad (10),$$

where $\tau_m$ is a magnet torque generated by magnetic energy of the permanent magnet, and $\tau_r$ is a reluctance torque generated by a difference in inductances.

However, the magnet torque $\tau_m$ may be expressed as the following Equation 11, and the reluctance torque $\tau_r$ may be expressed as the following Equation 12.

$$\tau_m = P_n \Phi_a i_q \quad (11),$$

where $P_n$ is a permanent magnet polar constant, and $\Phi_a$ is magnetic flux interlinkage, and $i_q$ is a q-axis driving electric current.

$$\tau_r = P_n(L_d - L_q) i_d i_q \quad (12),$$

where $P_n$ is a permanent magnet polar constant, and $L_d$ is a d-axis inductance, and $L_q$ is a q-axis inductance, and $i_d$ is a d-axis-driving electric current, and $i_q$ is a q-axis driving electric current.

Thus, the value of the torque τ of the motor 100 may be expressed as the following Equation 13 using the above Equations 10 through 12.

$$\tau = P_n \Phi_a i_q + P_n(L_d - L_q) i_d i_q \quad (13),$$

where the magnetic flux interlinkage $\Phi_a$ in Equations 11 and 13 may be expressed as the following Equation 14.

$$\Phi_a = \Phi_a|_{ref}(1 - K_{temp} \Delta T_{magnet}) \quad (14),$$

where $\Phi_a|_{ref}$ is reference magnetic flux interlinkage, and $K_{temp}$ is a temperature coefficient according to the permanent magnet, and $\tau T_{magnet}$ is a variation quantity of temperature of the permanent magnet of the permanent magnet portion 121.

Furthermore, $\Delta T_{magnet}$ in Equation 14 may be expressed as the following Equation 15.

$$\Delta T_{magnet} = T_e - T_{ref} \quad (15),$$

where $T_e$ is an estimated temperature of the permanent magnet, and $T_{ref}$ is an expected reference temperature of the permanent magnet when the motor is driven.

By using the above Equations 13 through 15, an estimated torque value $T_e$ in which the value of the torque τ of the motor 100 is estimated, may be expressed as the following Equation 16.

$$\tau_e = P_n i_q \Phi_a|_{ref} + P_n i_q \Phi_a|_{ref} K_{temp}(T_{ref} - T_e) + P_n(L_d - L_q) i_d i_q$$

According to Equation 16, the estimated torque value $\tau_e$ of the motor 100 is expressed as a function of the estimated temperature $T_e$ of the permanent magnet portion 121. That is, as the temperature $T_e$ of the permanent magnet portion 121 of the motor 100 is increased, magnetic flux interlinkage $\Phi_a$ is decreased, and the estimated torque value $\tau_e$ of the motor 100 is also decreased.

Hereinafter, an operation of controlling driving of the motor 100 using the temperature value $T_e$ of the permanent magnet portion 121 and the estimated torque value $\tau_e$ of the motor 100 that are estimated as above, will be described.

First, the user or manufacturer defines a "safe temperature" of the permanent magnet of the permanent magnet portion 121. Here, examples of the "safe temperature" may include temperature relating to a level of demagnetization of the permanent magnet, temperature relating to a level at which stable torque control may be performed, and so on. Here, when the "safe temperature" is related to a level of demagnetization, at least one selected from the group consisting of a temperature at which demagnetization of the permanent magnet starts, a temperature at which a level of demagnetization is increased by about 10% compared to a normal state, and a temperature at which a level of demagnetization is increased by about 20% compared to the normal state may be used as the "safe temperature".

The driving controller 270 simultaneously performs two types of control operations, such as a "first control operation" and a "second control operation" as driving control of the motor 100. Here, the "first control operation" is a control operation based on the "safe temperature" so as to prevent demagnetization of the permanent magnet portion 121, and the "second control operation" is a control operation for precisely controlling the torque of the motor 100.

Description of First Control Operation

If driving of the motor 100 starts, the driving controller 270 receives the temperature value $T_e$ of the permanent magnet of the permanent magnet portion 121 that is estimated by the permanent magnet temperature estimating portion 250 in real-time.

The driving controller 270 monitors the estimated temperature value $T_e$ of the permanent magnet portion 121 that is received from the permanent magnet temperature estimating portion 250 in real-time. If the estimated temperature value $T_e$ of the permanent magnet portion 121 reaches the "safe temperature", the driving controller 270 reduces the magnitude of a driving input electric current input to the motor 100 or does not supply the driving input electric current temporarily, thereby lowering the temperature inside the permanent magnet portion 121 and the motor 100. If so, demagnetization of the permanent magnet of the permanent magnet portion 121 may be prevented.

As another example of the control method based on the "safe temperature", the driving controller 270 monitors whether the estimated temperature value $T_e$ of the permanent magnet portion 121 reaches the "safe temperature", and if the estimated temperature value $T_e$ of the permanent magnet portion 121 reaches the "safe temperature", the driving controller 270 lowers the temperature of the cooling fluid that enters the cooling flow path portion 140 or increases the flow of the cooling fluid in the cooling flow path portion 140, thereby increasing heat transfer and lowering the temperature inside the permanent magnet portion 121 and the motor 100. If so, demagnetization of the permanent magnet of the permanent magnet portion 121 may be properly prevented.

Description of Second Control Operation

If driving of the motor 100 starts, the driving controller 270 receives the estimated torque value $\tau_e$ of the motor 100 from the torque estimating portion 260 in real-time, and monitors the estimated torque value $\tau_e$. As the motor 100 is driven, the temperature of the permanent magnet rises. In general, magnetic flux interlinkage $\phi_a$ is reduced, and the estimated torque value $\tau_e$ of the motor 100 is also decreased. Subsequently, if the estimated torque value $\tau_e$ of the motor 100 does not reach a "range of a normal torque that is determined to correspond to the input driving electric current", the driving controller 270 recovers the torque of the motor 100 into the range of the normal torque as a method of increasing a driving electric current so that stable control may be performed. Furthermore, when an excessive torque is generated due to malfunction of the motor 100, the driving controller 270 performs a control operation of recovering the torque of the motor 100 into the range of the normal torque by reducing the driving electric current so that stable and precise torque control may be performed.

According to the current embodiment, the driving controller 270 performs two types of control operations simultaneously. That is, since the driving controller 270 that is performing the "second control operation" performs the "first control operation" of always monitoring whether the estimated temperature value $T_e$ of the permanent magnet of the permanent magnet portion 121 reaches the "safe temperature" and of preventing demagnetization of the permanent magnet, the driving controller 270 performs both precise torque control and prevention of demagnetization of the permanent magnet.

According to the current embodiment, the driving controller 270 performs two types of control operations. However, embodiments are not limited thereto. That is, the driving controller 270 according to an exemplary embodiment may selectively perform only one of two types of control operations according to the user's need. For example, the user may manipulate the driving controller 270 to perform only the first control operation of the "first control operation" and the "second control operation" or only the "second control operation" thereof.

As described above, in the system 200 and method of controlling the motor 100 according to the current embodiment, the thermal equivalent circuit of the motor 100 is configured, and the temperature value of the permanent magnet portion 121 is estimated by measuring the temperature value of the cooling fluid that enters the cooling flow path portion 140, the rotation speed value of the rotor 120, and the driving electric current value of the motor 100 so that the temperature value of the permanent magnet portion 121 may be precisely and simply estimated.

Also, the estimated temperature of the permanent magnet portion 121 is used to control the motor 100 so that excessive demagnetization of the permanent magnet portion 121 while the motor 100 operates may be prevented. If so, unexpected lowering of the output torque of the motor 100 due to demagnetization is prevented so that stable output control may be performed. Furthermore, a breakdown is prevented from occurring due to overheat of the motor 100 so that the lifespan of the motor 100 may be increased.

In addition, estimating of the actual torque of the motor 100 is performed using the estimated temperature of the permanent magnet portion 121, and the estimated torque is used to drive and control of the motor 100 so that precise control on the output torque of the motor 100 may be performed. If so, stability of control of the torque of the motor 100 may be improved.

The motor 100 according to the current embodiment described as above has a structure of an IPMSM in which a permanent magnet is embedded in the rotor 120. However, a motor to which the inventive concept is applied, is not limited thereto. That is, there are no special limitations in the form or structure of the motor to which the inventive concept may be applied. For example, the motor may have one of various forms and structures, such as a surface-mounted permanent magnet synchronous motor (SPMSM), a DC motor, an AC motor, a stepping motor, and a linear motor, according to other exemplary embodiments.

As described above, according to the one or more of the above embodiments, a temperature of a permanent magnet portion disposed at a rotor is estimated, and the estimated temperature of the permanent magnet portion is used to control a motor so that a torque may be prevented from being lowered due to demagnetization of a permanent magnet, stability in controlling the motor may be improved and a breakdown may be prevented from occurring due to overheat of the motor.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A system for controlling a motor which comprises a stator, a rotor comprising a permanent magnet portion, a housing which accommodates the stator and the rotor, and a cooling flow path portion which is disposed at the housing and configured to pass a cooling medium therethrough, the system comprising:
  a data storage unit configured to store data relating to a thermal equivalent circuit of the motor;
  a temperature measuring unit configured to measure a temperature of the cooling medium which enters the cooling flow path portion;
  a rotation speed measuring unit configured to measure a rotation speed of the rotor;
  a driving electric current measuring unit configured to measure a driving electric current of the motor;
  a permanent magnet temperature estimating unit configured to estimate a temperature of the permanent magnet portion of the rotor using the data stored in the data storing unit, a temperature value of the cooling medium measured by the temperature measuring unit, a rotation speed value of the rotor measured by the rotation speed measuring unit, and a driving electric current value measured by the driving electric current measuring unit; and
  a driving controller configured to control driving of the motor based on the temperature of the permanent magnet portion of the rotor estimated by the permanent magnet temperature estimating unit.

2. The system of claim 1, wherein the stator comprises:
  a stator core; and
  coils wound around the stator core.

3. The system of claim 2, wherein the thermal equivalent circuit comprises a plurality of heating sources comprising the stator core, the coils and the permanent magnet portion.

4. The system of claim 3, wherein the thermal equivalent circuit comprises a plurality of thermal resistances comprising a resistance at the rotor, a resistance at the stator core, a resistance at the housing, and a resistance at the cooling medium.

5. The system of claim 4, wherein the permanent magnet temperature estimating unit is configured to obtain a reference torque value of the motor using the driving electric current value of the motor, obtain an efficiency value of the motor using the reference torque value of the motor and the rotation speed value of the rotor, obtain total loss heat of the motor from the efficiency value of the motor, obtain a temperature value of the cooling medium discharged from the cooling flow path portion using the total loss heat of the motor, and estimate a temperature value of the permanent magnet portion using the temperature value of the cooling medium discharged from the cooling flow path portion and values of the thermal resistances.

6. The system of claim 4, wherein the permanent magnet temperature estimating unit is configured to obtain an efficiency value of the motor using the driving electric current value of the motor and the rotation speed value of the rotor, obtain total loss heat of the motor from the efficiency value of the motor, obtain a temperature value of the cooling medium discharged from the cooling flow path portion using the total loss heat of the motor, and estimate a temperature value of the permanent magnet portion using the temperature value of the cooling medium discharged from the cooling flow path portion and the values of the thermal resistances.

7. The system of claim 1, further comprising a torque estimating unit configured to estimate a torque value of the motor using the temperature value estimated by the permanent magnet temperature estimating unit.

8. The system of claim 7, wherein the driving controller is configured to control driving of the motor using the estimated torque value of the motor.

9. The system of claim 1, wherein the driving controller is configured to define a safe temperature of the permanent magnet portion and control a driving electric current input to the motor if the estimated temperature value of the permanent magnet portion reaches the safe temperature.

10. The system of claim 9, wherein the safe temperature of the permanent magnet portion is related to a level of demagnetization of a permanent magnet of the permanent magnet portion.

11. A method of controlling a motor which comprises a stator, a rotor comprising a permanent magnet portion, a housing which accommodates the stator and the rotor, and a cooling flow path portion which is disposed at the housing and configured to pass a cooling medium therethrough, the method comprising:
 configuring a thermal equivalent circuit of the motor;
 checking a temperature value of the cooling medium which enters the cooling flow path portion, a rotation speed value of the rotor and a driving electric current value of the motor;
 estimating a temperature value of the permanent magnet portion of the rotor using the thermal equivalent circuit, the temperature value of the cooling medium which enters the cooling flow path portion, the rotation speed value of the rotor and the driving electric current value of the motor; and
 controlling driving of the motor based on the estimated temperature of the permanent magnet portion of the rotor.

12. The method of claim 11, wherein the stator comprises a stator core and coils wound around the stator core.

13. The method of claim 12, wherein the thermal equivalent circuit comprises a plurality of heating sources comprising the stator core, the coils and the permanent magnet portion.

14. The method of claim 13, wherein the thermal equivalent circuit comprises a plurality of thermal resistances comprising a resistance at the rotor, a resistance at the stator core, a at resistance the housing, and a resistance at the cooling medium.

15. The method of claim 14, wherein the estimating the temperature value of the permanent magnet portion comprises:
 obtaining a reference torque value of the motor using the driving electric current value of the motor;
 obtaining an efficiency value of the motor using the reference torque value of the motor and the rotation speed value of the rotor;
 obtaining total loss heat of the motor from the efficiency value of the motor;
 obtaining a temperature value of the cooling medium discharged from the cooling flow path portion using the total loss heat of the motor; and
 estimating a temperature value of the permanent magnet portion using the temperature value of the cooling medium discharged from the cooling flow path portion and values of the thermal resistances.

16. The method of claim 14, wherein the estimating the temperature value of the permanent magnet portion comprises:
 obtaining an efficiency value of the motor using the driving electric current value of the motor and the rotation speed value of the rotor;
 obtaining total loss heat of the motor from the efficiency value of the motor;
 obtaining a temperature value of the cooling medium discharged from the cooling flow path portion using the total loss heat of the motor; and
 estimating a temperature value of the permanent magnet portion using the
 temperature value of the cooling medium discharged from the cooling flow path portion and the values of the thermal resistances.

17. The method of claim 11, further comprising estimating a torque value of the motor using the estimated temperature value of the permanent magnet portion.

18. The method of claim 17, wherein the controlling driving of the motor comprises controlling driving of the motor using the estimated torque value of the motor.

19. The method of claim 11, wherein the controlling driving of the motor comprises:
 defining a safe temperature of the permanent magnet portion; and
 controlling a driving electric current input to the motor if the estimated temperature value of the permanent magnet portion reaches the safe temperature.

20. The method of claim 19, wherein the safe temperature of the permanent magnet portion is related to a level of demagnetization of a permanent magnet of the permanent magnet portion.

* * * * *